Jan. 5, 1960   S. FORBES   2,920,028
ELECTROLYTIC CELL SERIES
Filed July 12, 1954   7 Sheets-Sheet 4

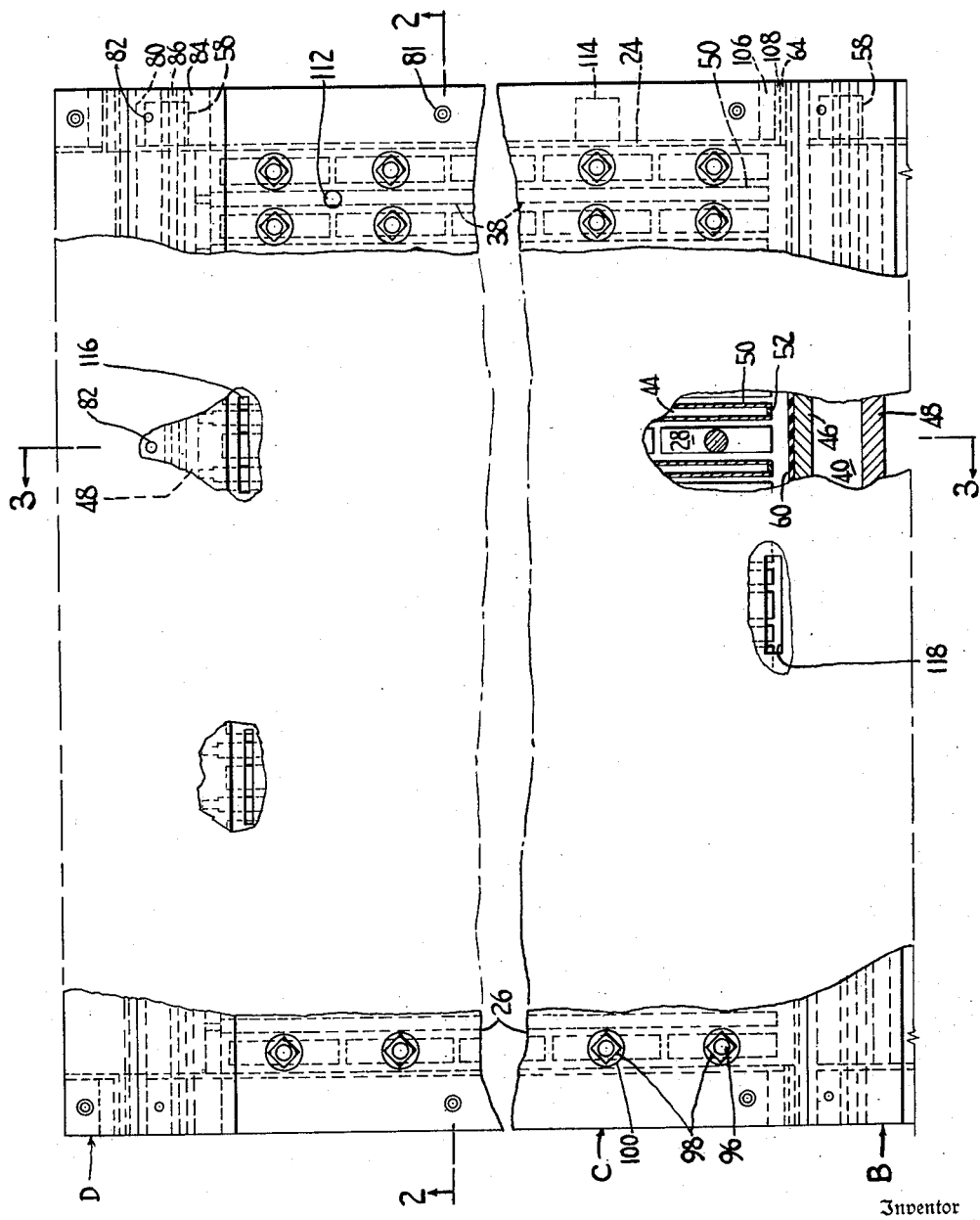

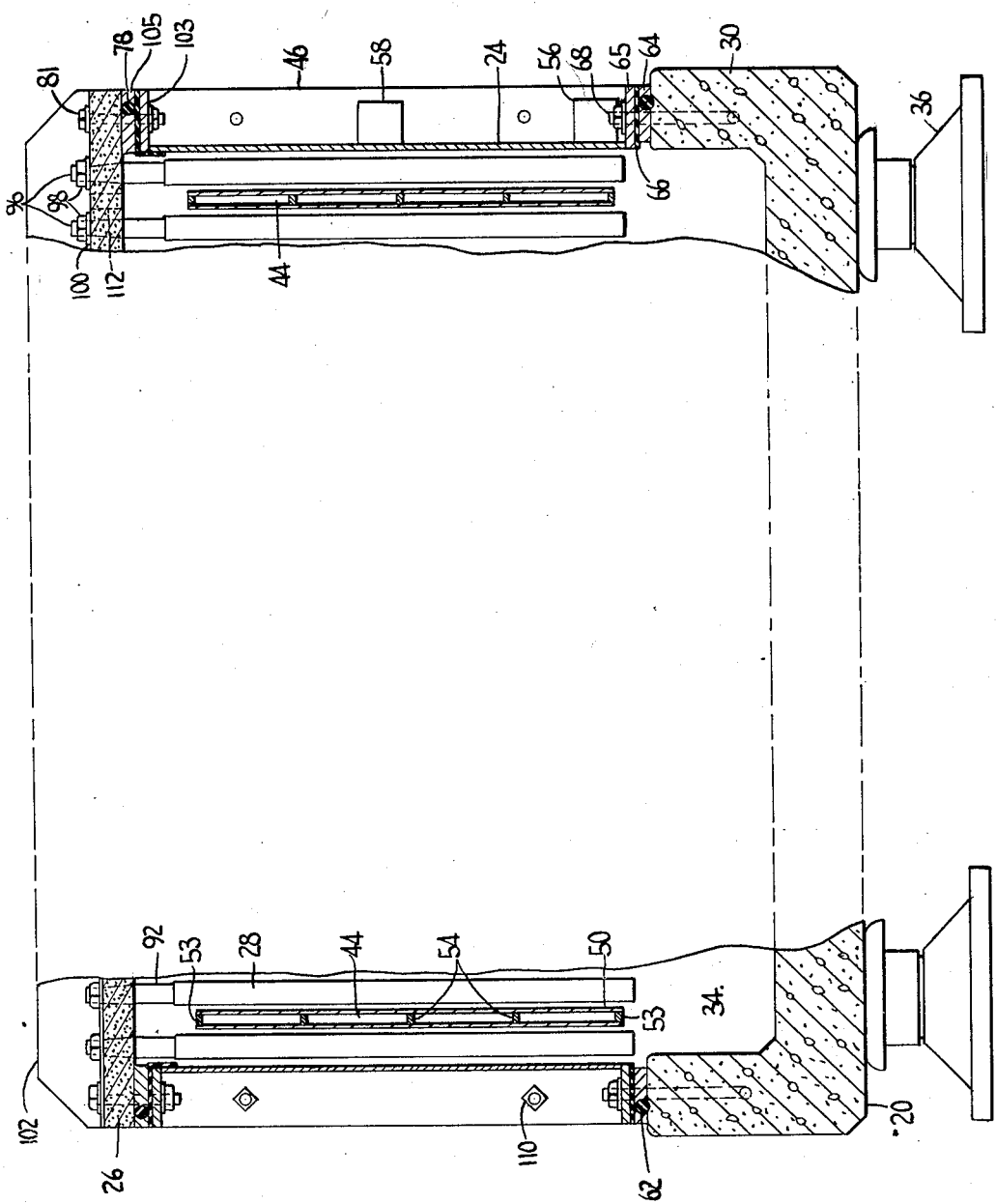

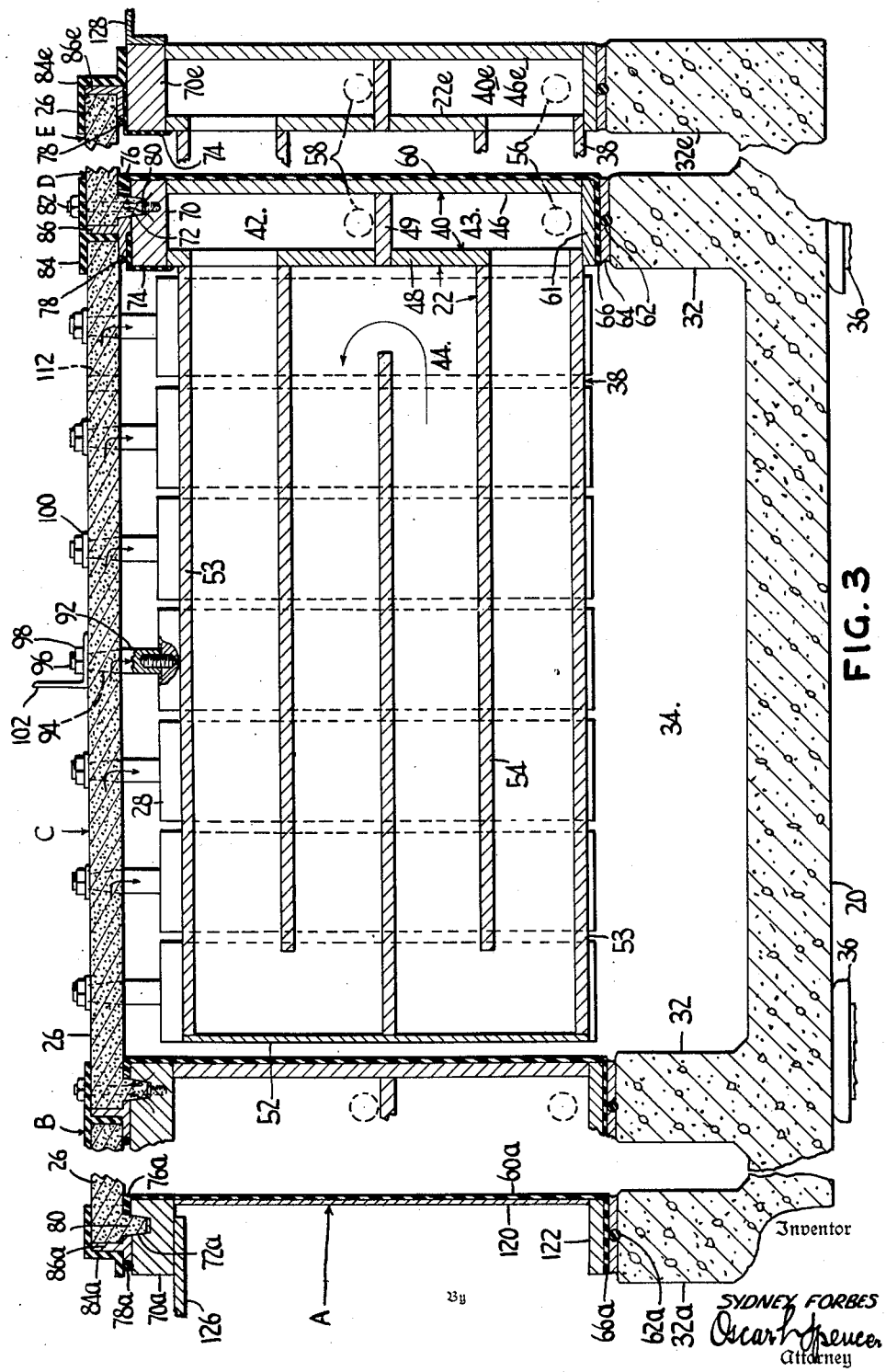

INVENTOR.
SYDNEY FORBES
BY Oscar L. Spencer
ATTORNEY

INVENTOR.
SYDNEY FORBES
BY Oscar L. Spencer
ATTORNEY

Jan. 5, 1960  S. FORBES  2,920,028
ELECTROLYTIC CELL SERIES
Filed July 12, 1954  7 Sheets-Sheet 6

INVENTOR.
SYDNEY FORBES
BY Oscar L. Spencer
ATTORNEY

INVENTOR.
SYDNEY FORBES
BY
Oscar L. Spencer
ATTORNEY

United States Patent Office 2,920,028
Patented Jan. 5, 1960

2,920,028

ELECTROLYTIC CELL SERIES

Sydney Forbes, Pittsburgh, Pa., assignor to Columbia-Southern Chemical Corporation, Allegheny County, Pa., a corporation of Delaware Application July 12, 1954, Serial No. 442,550

12 Claims. (Cl. 204—253)

This invention relates to electrolytic cells and in particular to cells for the electrolysis of brine.

Various electrolytic cells already are known for this purpose. These include individual electrolytic cells, lines of which are conventionally connected together in series and bipolar cells wherein there are a plurality of cell units in series which effectively constitute a single large cell.

From the standpoint of efficiency and volume of space occupied, bipolar cells are advantageous. One difficulty with such cells, however, lies in the fact that failure of one cell unit, due for example to excessive erosion of anodes, usually forces shut down of the entire cell.

According to this invention a novel cell has been provided which has the advantageous characteristics of the bipolar cell and yet is so constructed that individual cell units can be repaired or isolated without requiring shut down of the entire cell.

According to the present invention the cell herein contemplated comprises a plurality of electrolytic cell units joined together in abutting relationship. Each unit includes a base, side walls, a cathode structure which includes a wall running laterally of the cell and forming an end wall of a cell unit and a plurality of longitudinally extending cathode fingers, and an anode assembly including an electrically conductive cover and a plurality of anodes depending therefrom. The various embodiments of the invention will be fully understood by reference to the ensuing specification and the accompanying drawings, in which:

Fig. 1 is a fragmentary top plan view drawn substantially to scale of a cell unit having the cover partially broken away to illustrate the cell interior as constructed according to one embodiment of the invention;

Fig. 2 is a fragmentary cross-section taken along the line 2—2 of Fig. 1;

Fig. 3 is a cross-section of the cell taken along the line 3—3 of Fig. 1;

Figure 5:
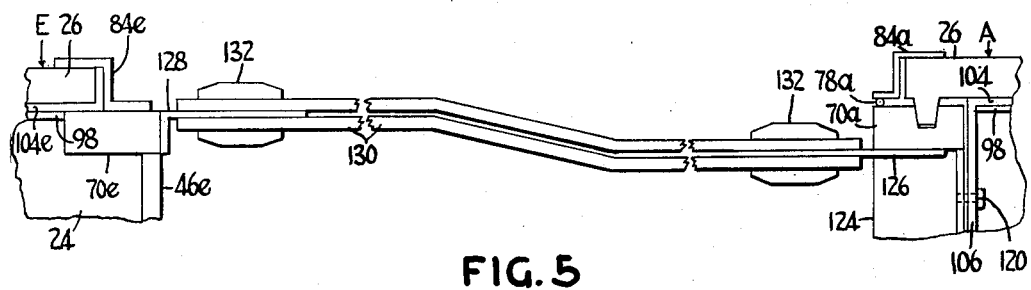
Fig. 5 is a side elevation showing an electrical connection between two series of cells.

Referring now to Figures 1 to 4 of the drawings and more particularly to Figs. 2 and 3, the cell consists of a plurality of aligned similarly constructed cell units A, B, C, etc. Each unit consists of a base 20, cathode assembly 22, side walls 24, and an anode assembly comprising electrically conductive cover plate or roof section 26 from which anodes 28 depend.

The cell base 20, which is best shown in Figs. 2 and 3, underlies an entire bank of cell units. It has a pair of upstanding longitudinal abutments 30 (Fig. 2) running along the edges thereof, and a plurality of upstanding lateral partitions 32 (Fig. 3). Abutments 30 and partitions 32 divide the base into a plurality of compartments 34, one for each cell unit. Each compartment 34 serves as a free space for sludge at the bottom of a cell unit. A plurality of insulated legs 36 support cell base 20 above the floor level.

Side walls 24 are supported on longitudinal abutments 30 of base 20, as may be seen in Fig. 2. The side walls are made of steel or other desired material which preferably is electroconductive. Flanges 103 and 65 are integral with each side wall along the upper and lower edges respectively thereof and provide means for securing the side walls to cover 26 and base 20 respectively (see Figs. 2 and 4). Flange 106 is provided along one vertical edge of each side wall 24 (see Fig. 1) so that a plurality of cell units may be secured in adjoining relationship as will be hereinafter explained. A rectangular portion is cut away from one corner along the top edge of each side wall. A U-shaped sealing gasket 62 rests in a shallow groove in abutments 30 and 32 of base 20 and supports flanges 65 of side walls 24, thereby forming a fluid tight seal between base 20 and side walls 24. The space between abutments 30 and flanges 65 may be filled with a layer 64 of putty or other sealing material. A thin covering 66 of hard rubber or like nonconducting material may cover the lower surface of flange 65, although this coating may be omitted. Foundation bolts 68 which are anchored in abutments 30 hold side walls 24 in place.

The cathode assembly 22, which may best be seen in Fig. 3, consists of side walls 24 and a plurality of spaced parallel hollow metal or other electroconductive cathode fingers 38 extending horizontally and longitudinally of the cell from a metal shell 40 or end section 40. The shell extends laterally across the cell, from one side to the other, being supported on lateral abutment 32 or base 20, and includes an imperforate wall 46 which forms an end wall dividing a pair of adjacent cell units, a second wall 48 parallel to wall 46, a bottom 61, a top 70, and a horizontal partition 49 at the mid-portion dividing shell 40 into upper and lower chambers 42 and 43 respectively.

The cathode fingers extend longitudinally of the cell from the shell and toward the next adjacent cathode assembly, terminating a short distance to the rear of such adjacent assembly.

Each cathode finger is a hollow rectangular prism consisting of a pair of side walls 50 (see Figs. 1 and 2) which are welded to wall 48, and end wall 52 (Figs. 1 and 3), and top and bottom walls 53 enclosing a space 44. The space 44 is divided by a plurality of baffles 54 which are joined alternately to wall 48 and wall 52 by welding or other desired means. Openings in wall 48 adjacent the top and bottom walls 53 of each finger permit communication between space 44 and upper and lower chambers 42 and 43 respectively of shell 40. Cooling water is introduced into chamber 43 through inlet opening 56 (shown in Fig. 4) and passes from chamber 43 through space 44 in each cathode finger 38, thence into upper chamber 42 of shell 40 and outlet opening 58 (see Figs. 1 and 4).

Side walls 24 abut against and are welded to walls 46 and 48 to form a fluid tight seal. Shell top 70 of steel or like conductive material is coextensive with wall 46 and extends beyond side walls 24. Rectangular portions of side walls 24 are cut away to permit extension of top 70 beyond side walls 24. Wall 48 terminates at side walls 24 and is welded or otherwise secured thereto. Shell bottom 61, which has the same width as wall 48, is welded along its ends to flanges 65, thereby forming a U-shaped frame underlying the walls of each cell unit. Shell top 70, bottom 61, partition 49, and walls 46 and 48 are all in electrical contact, forming part of the cathode structure.

To insulate the cathode of each cell unit from the electrolyte in the next adjacent cell unit, a thin covering 60 of hard rubber or the like covers those surfaces of end wall 46 and shell top 70 which are adjacent the next cell unit, and a covering 66, also of hard rubber or the like covers the lower surface of shell bottom 61.

A fluid tight seal between cell base 20 and the cell walls is formed by U-shaped sealing ring 62, of soft rubber or the like, which is atop abutments 30, 32 and rests in a groove provided in said abutments. The ends of each sealing ring 62 engage sealing ring 62 of the previous cell unit to provide a fluid tight seal around each cell unit. Shell bottom 61 and side wall flanges 65 rest on sealing ring 62 over transverse and longitudinal abutments 32 and 30 respectively. A layer 64 of putty or like sealing material fills the space between the tops of abutments 30, 32 and the flanges 65 and shell bottom 61. A thin layer 66 of hard rubber or the like on the lower face of shell bottom 61 protects the metallic surface from possible contact with electrolyte. The covering 66 may also extend under side wall flanges 65 as shown in Fig. 2, although this is not necessary as flanges 65, being welded to side walls 24 which form part of the cathode of the cell unit, are protected from corrosion by cathodic protection.

The top 70 of shell 40 is thick and has a trough 72 having a horizontal bottom and two sloping sides inclined at an angle of approximately 1° 30″ from the vertical. This corresponds to a downward decrease in the width of the trough of ⅝ inch per foot of vertical distance. According to this invention it has been found that the magnitude of this taper, that is, the electrical contact established with substantially different degrees of taper is inferior to that achieved with the trough of the taper herein specified.

The anode assembly (see Fig. 3) comprises a cover or roof section 26 of graphite or like electroconductive corrosion resistant material having rigidly mounted therein a plurality of anodes 28 which also may be of graphite. These anodes are disposed in rows and are so aligned to be adapted to be inserted in the spaces between the cathode fingers 38.

Cover 26 of each cell unit is removably secured to flanges 103 (Fig. 2) of side walls 24 and to shell top 70 (see Fig. 3) of the preceding cell unit by rows of bolts 81 and 82 respectively. Cover 26 has a laterally extending rib 80 adjacent one end which fits in groove 72 in top 70 of the preceding cell unit, providing electrical contact therewith. The opposite end of cover 26 is supported freely on shell top 70 of the cell unit over which cover 26 lies. A U-shaped ring 78 of soft rubber or other insulating material spaces cover 26 from shell top 70 (Fig. 3) and flanges 103 (Fig. 2), and bolts 81 are insulated from cover 26 and flanges 103 so that there is no short circuiting between cover 26, which is electropositive, and the cathode of the same cell. Thus it will be clear that each anode assembly is out of electrical contact (except through the electrolyte) from the next succeeding assembly and also from the cathode assembly against which it is opposed.

Cover 26 is constructed of an impervious, electrically conductive, and preferably corrosion resistant material such as graphite. It may be constructed of a metal such as steel, in which case the lower face, which is exposed to the cell contents, is covered with a corrosion resistant sheet or coating, as for example a thin sheet of rubber.

Each cover 26 has a depending rib 80 which fits into trough 72 and has the same taper as that of the trough in the steel top 70 of the previous cell. The cover 26 and shell top 70 are bolted together by several bolts 82 along one edge of the cover and the opposite end of cover 26 rests freely on sealing strip 78. A strip 76 of soft rubber lies between cover 26 and shell top 70 adjacent rib 80. If desired a thin covering of hard rubber covers the upper surface of top 70 and strip 76 is attached thereto. A nonconductive plate member 84 having a T-shaped cross section and extending the width of a cell has a vertical portion which separates covers or members 26 of adjacent cell units and a horizontal portion which lies over the tops of each cover along the edges thereof. Insulator 84 may be made of any suitable insulating material such as a synthetic resin, resin-mica composition, porcelain, etc. This plate serves to hold the cover plate in place. The space 86 beneath cover 26 and between cover 26 and member 84 is filled with putty or the like.

In the event it is necessary to shut down one cell unit in a series, the series may be continued in operation by providing a shunt (not shown) between covers or members 26 of a pair or several adjacent cell units.

Referring especially to Fig. 3, anodes 28 depend from cover 26 and are secured thereto by supporting rods 92. Each rod 92 has an upwardly tapering portion 94 which fits into a correspondingly tapered opening in cover 26.

The taper of such portion 94 is about ⅝ inch per foot. That is the sides are about one degree 30 minutes from the vertical in order to obtain maximum electrical contact between the cover and the anode.

The upper portion 96 of each rod 92 is cylindrical and externally screw threaded to receive nut 98, which secures rod 92 to cover 26. A washer 100 is ordinarily inserted between nut 98 and cover 26. Anodes 28 are arranged in a plurality of parallel rows which are parallel to cathode fingers 38, as may be seen most clearly in Figs. 1 and 2.

An angle iron 102 extends laterally across each cover 26 at about the mid-portion thereof to prevent cover 26 from sagging. Such reinforcement is desirable inasmuch as cells for the production of alkali metal chlorate are of relatively great length due to the low current density. One row of anode supporting rods 92 extend through angle iron 102, thereby securing the same to cover 26. Angle iron 102 is secured to side wall flanges 103 by a pair of bolts 81, as shown in Fig. 2.

Figure 4:
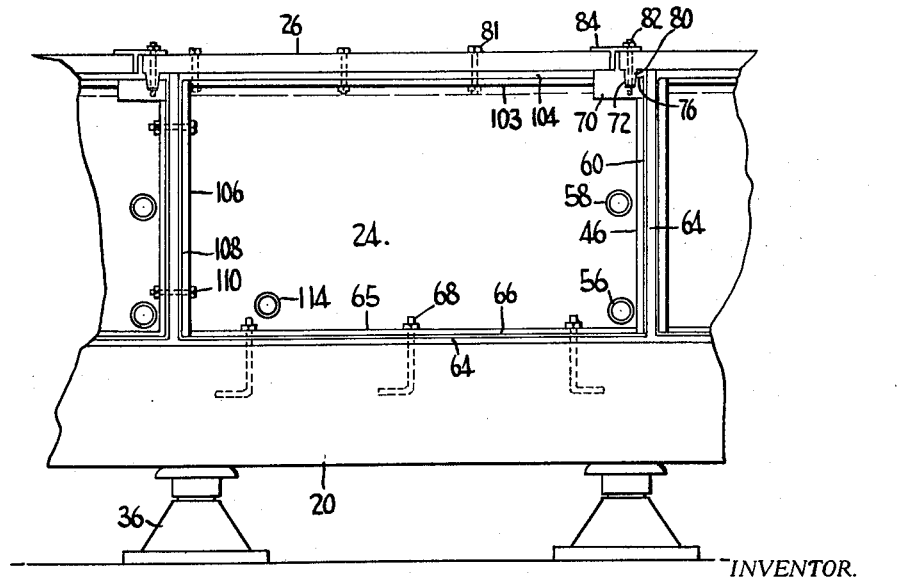
Fig. 4 is a side elevation of the cell.

Flange 106 is integral with each side wall 24 along the edge thereof remote from shell 40 (Figs. 1 and 4). A thin sheet or coating 108 of rubber or like non-conductor covers the outside surface of flange 106. Flange 106 is bolted to end wall 46 of the adjacent cell unit by bolts 110, thereby securing two adjacent cell units together in adjoining relationship. Bolts 110 are insulated from flanges 106 and end wall 46.

Cover 26 is provided with an opening 112 (Figs. 1 and 3) for admission of brine to the cell. An opening 114 in the lower portion of one side wall 24 (Figs. 1 and 4) permits removal of electrolyte which contains sodium chlorate and unreacted sodium chloride. Air is admitted to the upper portion of each cell unit through rectangular openings 116 in cover 26, and is forced into these openings through conduits not shown. A mixture of air and gases formed in electrolysis leaves the cell unit through rectangular opening 118.

The first and last cell units A and E respectively in each series (see Fig. 3) are constructed in the same manner as the intermediate cell units with those exceptions in the end wall and electrical conductor structures which are necessitated by the positions of cell units A and E as end cell units. Referring first to cell unit A, the cathode assembly, which includes a partition dividing unit A from the next adjacent unit B of the series, and the anode assembly are identical to their counterparts in the intermediate cell in the series, and are therefore not shown in the drawing.

The construction which is peculiar to cell A will now be described with reference to Fig. 3. Lateral abutments 32a forms one end wall of cell base 20 and supports wall 120, which forms the front end wall of the cell series as well as the end wall of unit A. A flange 122 is integral with wall 120 along its lower end. Wall 120 and flange 122 are covered with coatings 60a and 66a respectively which are similar to coatings 60 and 66. Flange 122 rests on a round sealing ring 62a, which in turn rests on abutment 32a. A metal top 70a similar in construction to shell tops 70 is supported on top of wall 120 and welded thereto. Top 70a has a trough 72a which receives depending rib 80 of cover 26 in cell unit A. Sealing gaskets 76a and 78a of rubber or the like space the upper face of top 70a from the lower face of cover 26. An insulator 84a rests on top of cover 26 and gasket 78a. The space 86a enclosed by insulator 84a is filled with putty or the like. A copper strip 126 which receives current either from a source of electric potential or from another series of cells is connected to top 70a.

The last cell unit E in a series has a cover 26 and cathode assembly identical to the corresponding structures in the other cell units in the series. The cathode assembly 22e is the same in construction as cathode assemblies 22 in the other units, except that end wall 46e forms an exterior rear end wall of the cell series and top 70e of shell 40e differs from tops 70. Top 70e has no trough as it does not receive a cell cover. The surfaces of top 70e which are exposed to electrolyte are covered with sheet or covering 74 of rubber or the like. Cover 26 is supported at one end by top 70e, resting on sealing ring 78. An insulator 84e lies over top 70e and cover 26, covering a substantial portion of the former. The space 86e beside and beneath the end portion of cover 26 is filled with putty or the like. An electrical conductor 128 of copper carries current from the cathode 22e of cell E to another series of cells or to the low potential side of an electrical potential source (not shown).

A plurality of banks of electrolytic cells may be connected in series if desired. As shown in Fig. 5, a pair of bus bars 130 are connected at one end to strip 128 and at the opposite end to strip 126, and are secured to each strip by clamp 132. Details of cell units A and E have been described above with reference to Figs. 3 and 4.

In the operation of the above identified cell for production of sodium chlorate, a concentrated solution of sodium chloride brine is continuously introduced into each cell unit through opening 112 in cover 26. The concentration of the solution is typically about 310 to 315 grams of sodium chloride per liter of solution. Lower concentrations of sodium chloride may be used but are less desirable because of the greater extent of side reactions, particularly the formation of oxygen. The solution is slightly on the acid side, typically having a pH of about 6.7. A solution level slightly below the tops of anodes 28 and above the top level of cathode fingers 38 is maintained in each cell unit. Electrolyte circulates freely between the anodes and the cathodes.

Cooling water is circulated through chambers 44 in cathode fingers 38 to maintain an operating temperature of about 90° F. in the cell. The cooling water enters inlet header 43 through pipe 56 and passes from header 43 into chambers 44, thence to outlet header 42 and outlet pipe 58. The effluent cell liquor, which contains a mixture of sodium chloride and sodium chlorate, is passed through a sodium chloride saturator (not shown) to form a saturated solution of sodium chloride. The solution is then introduced into another cell unit, where more sodium chlorate is generated and so on until the solution contains about 450 to about 600 grams of sodium chlorate per liter of solution. The sodium chlorate is then recovered.

Electric current flows from a source of power not shown via copper conductor 126 and current collector 70a to cover 26 of cell unit A. From cover 26 the current flows to anodes 28, then through the solution to cathode fingers 38, from which it flows to cathode shell 40 and shell top 70, thence to cover 26 of the next adjacent cell, and so on through the entire series. From the last cell E in the series current flows via conductor 128 and bus bars 130 either to a second series of cells in series with the first, as shown in Fig. 5, or to the low voltage side of a source of electric potential. The voltage drop in a cell series normally is about 3.5 to 3.6 volts per cell unit, although the voltage drop in a given cell unit may be considerably greater or less, depending largely on the extent to which the anodes have been consumed. The anode current density is maintained at about 35 amperes per square foot.

In operation of a cell series of this character, one cell unit may fail due to anode breakage, erosion or the like, before the others. In such a case this cell may be shunted from the circuit.

For example if cell unit B fails, cell unit A may be connected directly to cell unit C and operations continued. If desired, the anode assembly of cell unit B may be removed, repaired and reinserted, the shunt from unit A to C removed and cell B placed in operation.

According to a further embodiment of the present invention, a cell may be constructed with separate anode and cathode compartments divided by a porous partition. This cell is particularly useful in the production of elemental chlorine and caustic soda by the electrolysis of brine. The cover and anode structures according to this embodiment of the invention are quite similar and may even be identical to the corresponding structure according to the embodiment previously described.

Referring now to Figures 6 to 9 of the drawings, the cell consists of a plurality of aligned and similarly constructed cell units F, G, H, etc. Each unit (see Fig. 9) consists of a metallic base 200 supported on insulator legs 201, a cathode assembly 202, side walls 204 (Fig. 6) and an anode assembly comprising electrically conductive cover 206 for example of graphite from which anodes 208 of graphite or the like depend.

Figure 6:
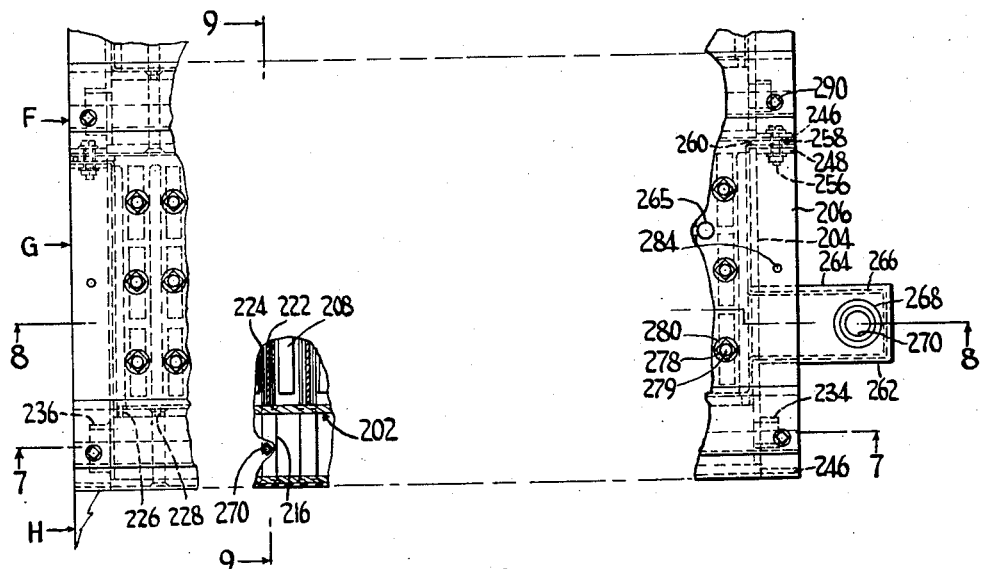
Fig. 6 is a fragmentary plan view drawn substantially to scale of a cell according to a modified embodiment of the invention with a portion of the cell cover broken away.
Figure 7:
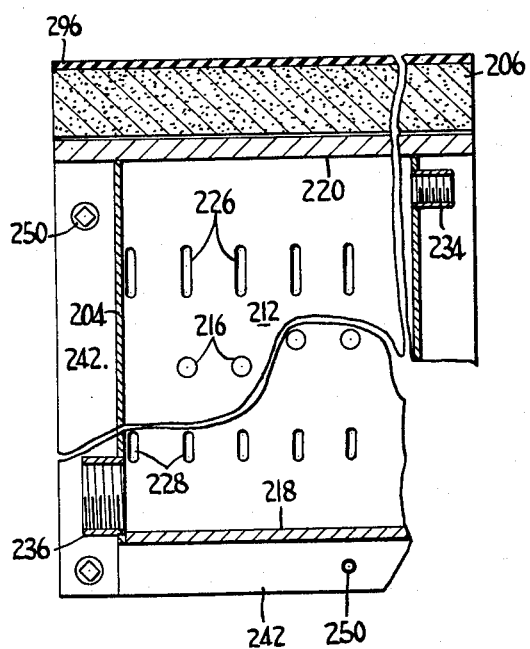
Fig. 7 is a fragmentary cross-section taken along line 7—7 of Fig. 6.
Figure 8:
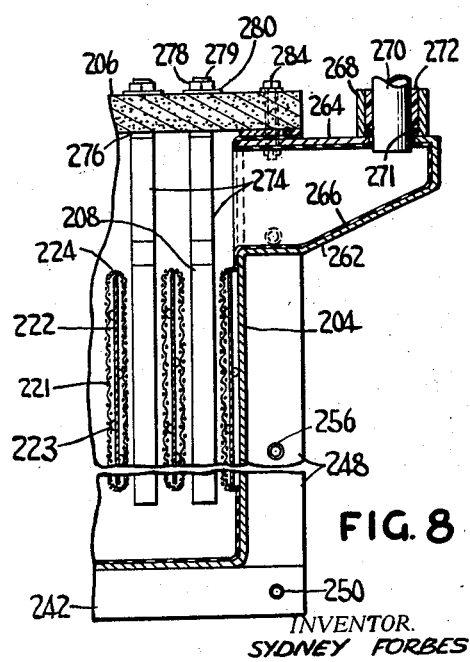
Fig. 8 is a fragmentary cross-section taken along line 8—8 of Fig. 6.
Figure 9:
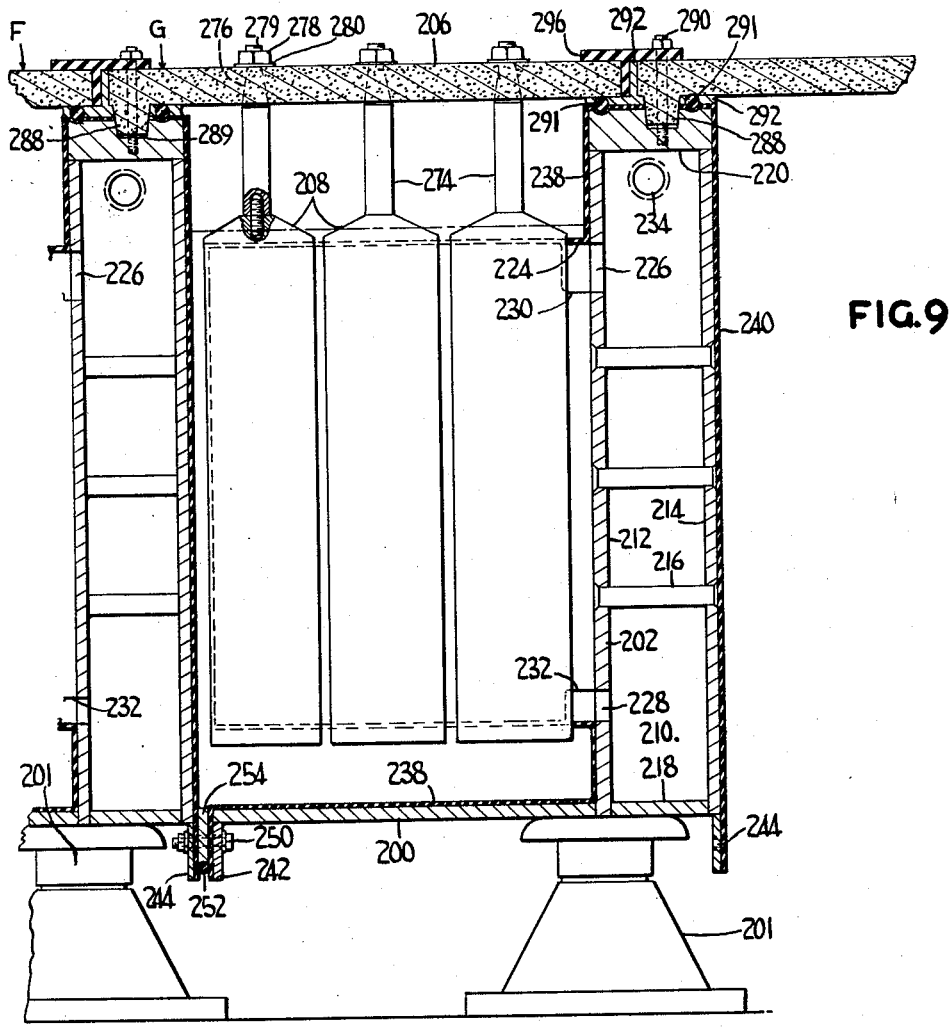
Fig. 9 is a cross-section taken along line 9—9 of Fig. 6.

The cathode assembly 202 in each cell unit includes a shell 210 which has two walls 212 and 214, a plurality of conducting rods 216 connecting the walls, a base 218 which forms an extension of cell base 200, a metallic top 220, as may be seen most clearly in Fig. 9, and a plurality of spaced parallel perforated metal plate or metal screen cathode fingers 221 which are reinforced by metal reinforcing members 222 having a plurality of dimples 223 and extending horizontally and longitudinally of the cell (see Figs. 6 and 8). The fingers 221 are integral with shell 210, and extend from wall 212 longitudinally across the cell unit to a point near wall 214 of the next adjacent cell unit, so that there is a small free space in each unit at the end opposite shell 210. The fingers 221 terminate short of base 200 and cover 206, leaving appreciable free spaces at the top and bottom of the cell. A plurality of woven wire screens 224, each surrounding the reinforcing member 222, are coated on the anode side with asbestos or the like porous material to form membranes or diaphragms which divide each cell unit into anode and cathode compartments. The portions of screen 224 surrounding each reinforcing member 222 rest against dimples 223 of the reinforcing member.

Walls 212 (Fig. 9) have two rows 226 and 228 of oblong openings near the top and bottom respectively of cathode fingers 221 to permit communication between the cathode chamber enclosed by the finger and the space enclosed by shell 210. There is an opening in each row adjacent each cathode finger, and portions 230 and 232 of each reinforcing member 222 are cut away adjacent openings 226 and 228 respectively. Hydrogen which is liberated by electrolysis escapes from the cathode chamber through openings 226, thence through outlet 234. Caustic soda which is formed in electrolysis is withdrawn from the cathode fingers through openings 228 and thence through outlet 236.

Metallic parts are protected from exposure to electrolyte in the anode chamber by sheet or coating 238 of rubber or the like, which covers cell base 200, the portion of wall 212 which defines a wall of the anode chamber, and shell top 220. The exterior surface of end wall 214 is covered with a sheet or coating 240 of rubber or the like, thus protecting the wall from corrosion and providing electrical insulation between the anolyte in each cell and the cathode of the previous cell unit.

Each cell unit is provided with two pairs of flanges 242 and 244, which are integral with cell base 200, and 246 and 248, which are integral with side walls 204 along opposite edges thereof. Flanges 242 and 244 of successive cell units are secured together by bolts 250, which are insulated from both flanges, and a fluid-tight connection is effected with sealing strip 252 and filling 254 of putty or the like (Fig. 9). Flanges 246 and 248 along the side walls 204 of successive units are secured together by insulated bolts 256, and a fluid-tight connection is effected with sealing strip 258 and filling 260 of putty or the like (Fig. 6).

An outlet 262 for chlorine is provided in side wall 204 in communication with the anode chamber. This outlet consists of a horizontal conduit 264 welded to wall 204 and lined with a sheet or coating 266 of rubber or the like to prevent corrosion, and an upstanding pipe 268 attached to conduit 264. A pipe 270 of Pyrex glass or other suitable corrosion resistant material has an end fitting into pipe 268 and is supported inside pipe 268. A round sealing ring 271 and a filling 272 of putty or the like occupy the annular space between pipes 268 and 270.

Each cell unit is covered by an electrically conductive cover 206 from which anodes 208 are supported by rods 274. Anodes 208 are arranged in a plurality of parallel rows which alternate with cathode fingers 221, as may be seen in Fig. 6. Supporting rods 274 have upwardly tapering portions 276 which fit into openings of corresponding taper in cover 206. Nuts 278 which engage externally screw threaded portions 279 on rods 274 secure the rods in place. Washers 280 space nuts 278 from cover 206.

Cover 206 is secured to flanges not shown which are welded to side walls 204 along the top edges thereof, by insulated bolts 284. An opening 265 is provided in cover 206 for the admission of sodium chloride brine to the anode chamber of each cell unit.

Rib 288 which depends from cover 206 has the mating contour corresponding to trough 289 in shell top 220 of the previous adjacent cell unit in the series. Thus, electrical connection between successive cell units is provided through cathode structure 210 of one cell unit, thence through cover 206 and anodes 208 of the next adjacent cell unit, thence through hte electrolyte in said cell unit to cathode structure 210 therein, and so on through the entire series of cell units. Bolts 299 secure cover 206 to shell top 220 of the preceding cell unit. A sealing ring 291 of rubber or the like encircles the perimeter of cover 206, and the space between top 220 and cover 206 is filled with putty 292 or the like.

The end of cover 206 opposite rib 288 rests on shell top 220 of the same cell unit over which cover 206 lies. Thus cover 206 is insulated from cathode shell top 220. Covers 206 of successive cell units are insulated by insulators 296.

Various modifications can be made in the cell structures shown in Figs. 1 to 9. For example, the cell cover may be made of a metal such as steel or aluminum and covered on the side exposed to the cell contents with a corrosion-resistant and moisture-proof sheet or coating of rubber or the like.

The anode supporting rods may be metallic if desired, in which case they are protected against corrosion by a sleeve of porcelain, graphite, or other corrosion-resistant material.

Other modifications may be made in the cell structures illustrated in Figs. 1–9. For instance, either a metallic or a concrete base may be used with either the sodium chlorate cell of Figs. 1–4 or the chlorine cell of Figs. 6–9.

In operation of the embodiment illustrated in Figs. 6–9 a solution of sodium chloride brine containing preferably about 310 to 315 grams of sodium chloride per liter is continuously introduced into the anode chamber of each cell unit through opening 265 in cover 206. The temperature in the cell which results from normal operation is about 160° to 200° F. The effluent electrolyte normally contains about 9 to about 11.5 percent by weight of caustic soda, and is removed from the cathode chamber through outlet 236. Chlorine is recovered from the anode chamber through outlet 262 and hydrogen is removed from the upper part of the cathode chamber through outlet 234.

Electric current passes serially through each cell unit in the series, passing from cover 206 in the first cell downwardly to the anodes 208 and through the solution therein, thence to cathode 202, and then to cover 206 of the next adjacent cell unit, and so on through the entire series. The voltage drop is approximately 3.1 to 4 volts per cell unit, depending largely on the degree to which the anodes have been consumed.

Figure 10:
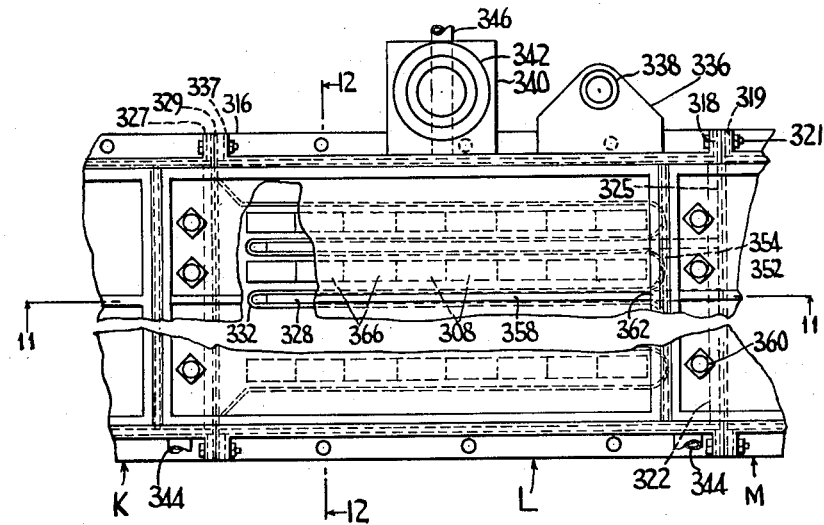
Fig. 10 is a fragmentary top plan view drawn substantially to scale of a cell with a portion of the cell cover cut away to show the cell interior according to a further modified form of the present invention.
Figures 11, 12:
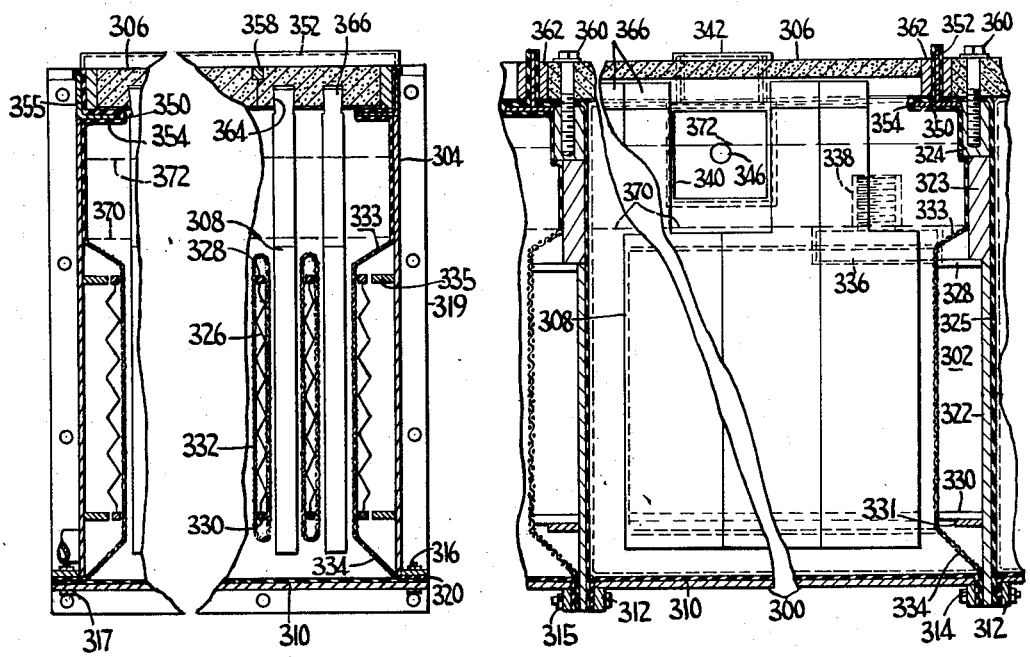
Fig. 11 is a fragmentary vertical section taken along line 11—11 of Fig. 10.
Fig. 12 is a fragmentary vertical section taken along line 12—12 of Fig. 10.

Referring now to Figs. 10 to 12, a third embodiment of the invention is illustrated. In this embodiment a cell series consists of a plurality of adjoining unit cells K, L, M, etc. Since the cell units are identical, further description is confined to one unit.

Each cell unit has a metallic base 300, cathode structure 302, side walls 304, electrically conductive cover 306, and anodes 308 suspended from cover 306.

Cell base 300 is covered with a thin sheet or coating 310 of rubber or the like so that it is insulated from the electrolyte in the cell. A pair of flanges 312, 314 depend from and are integral with base 300 along the edges thereof at each end of each cell unit, and provide means for securing adjacent cell units together, as is shown in Fig. 11. Bolts 315 secure flanges 312 and 314 together.

The side walls 304 of each unit cell are each provided with a flange 316 along the lower edge thereof. These flanges 316 rest on cell base 300 and are secured thereto by bolts 317. Sheet 310 on base 300, and sheet 320 of rubber or the like underneath flange 316 form a fluid tight seal between base 300 and side walls 304, as may be seen in Fig. 12.

Adjacent cell units are secured together along bottom flanges 312, 314 as has been mentioned, and along flanges 318, 319, which are integral with side walls 304. Bolts 321 which pass through flanges 318, 319 and are insulated from both flanges hold the two flanges together. Flange 318 is covered on the side adjacent flange 319 by rubber covering 325, which extends the width of the cell, and on the opposite side by coating 327 of rubber or the like. Sheets or coatings 329, 337 cover flange 319.

The cathode structure 320 has a plurality of vertical wall portions 322, 323, 324, which together form the partition between two adjacent cell units. These wall portions are welded together and lie one above the other, and each portion is thicker than the portion below. Wall portion 322 extends below the level of base 300, and the lower portion is sandwiched between flanges 312 and 314 of adjacent cell units, as may be seen in Fig. 11, and held in place by bolts not shown. Wall portions 322, 323, 324 are aligned so that they form one continuous surface on the side facing the next adjacent unit cell. This surface is covered with a sheet or coating 325 of rubber or the like to prevent contact of cathode 302 with the electrolyte in the next adjacent unit cell.

A plurality of parallel corrugated metallic reinforcing sheets 326 extend transversely from wall 322 substantially the entire length of a cell unit, as shown in Fig. 10, and are attached along their upper and lower edges to rods 328 and 330, are welded to and also extend transversely from wall 322. Rod 330 is supported adjacent wall 322 by a short brace 331 as is shown in Fig. 11. The lateral movement of the rods 328 nearest side walls 304 is limited by limit stops 335.

Surrounding reinforcing sheets 326 is an undulating woven wire cathode screen 332 which is welded along its edges to side walls 304. A diaphragm of asbestos or the like fills the interstices of screen 332 and divides each cell into an anode chamber and a cathode chamber. The undulations of screen 332 form a plurality of fingers, one surrounding each cathode sheet 326. Each finger consists of a pair of parallel screen surfaces which converge in rounded portions above rod 328, below rod 330, and beyond the extremity of sheet 326, as may be seen in Fig. 12. Sloping flat screen sections 333, 334 join the cathode fingers of screen 332 with walls 304.

Hydrogen outlet 336 opens through one side wall 304 in communication with the cathode chamber and has an upstanding pipe 338. Chlorine outlet 340 opens through one side wall 304 in communication with the anode chamber, and has an upstanding pipe 342. An outlet 344 for caustic soda in communication with the lower portion of the cathode chamber is provided in the opposite side wall 304. Sodium chloride brine is fed into the anode compartment of each cell unit through horizontal pipe 346 which is concentric with chlorine outlet 340.

A U-shaped supporting frame 350 for cover 306 has a transverse flat portion welded to wall portion 324 and a pair of longitudinal flat portions lying above side walls 304. A transverse upright flange 352 extending upwardly from the frame 350 separates covers 306 of adjacent cell units. Longitudinal flanges 355 extending upwardly from frame 350 form extensions of side walls 304. The frame 350 and transverse upright flange are covered on both sides, and flanges 355 on the inside surfaces, by covering 354 of rubber or the like.

An electrically conductive cover 306, which is preferably made of graphite, consists of a plurality of sections as may be seen in Fig. 10, each of which rests at one end on horizontal extension 350 of the cell unit which it covers and at the other end on the top cathode wall portion 324 of the previous adjacent unit in the series. Portions of each section 306 are cut away along the edges thereof to form grooves which receive sealing material 358 of putty or the like. A plurality of bolts 360, which are made in a single piece and preferably of copper, secure each cover section 306 to wall portion 324 of the previous cell and provide an electrical connection therebetween. A roughened surface is provided on bolts 360 to contact cover 306 and thereby minimize resistance in the electrical connection. Vertical strip 352 separates covers 306 of two successive cell units. There is a small space between the ends of a cover 306 and strip 352, and this space is filled with a layer 362 of putty or the like.

A plurality of grooves 364, which have said walls sloping downwardly and inwardly, are formed in the under side of each cover section 306, as is shown in Fig. 12. Grooves 364 are open at one end of cell cover sections 306 and extend the greater part of the length of said sections.

The upper portions of anodes 308 are approximately half as wide as the main portions. The tops 366 of the upper portions are keyed to fit into grooves 364. Anodes 308 are assembled in place in cover sections 306 when the latter are removed from the cell. This is done by sliding the anodes in the open ends of grooves 364 until the first anode in each groove 364 touches the closed end thereof and each successive anode touches the adjacent anode in the manner shown in Fig. 11.

In operation of the cell series shown in Figs. 10 to 12, sodium chloride brine having a concentration of about 310 to 315 grams of sodium chloride per liter is continuously introduced into the anode chamber of each cell unit through opening 346. The sodium chloride concentration may be lower, although this is not desirable because of the increasing tendency toward side reactions at lower concentrations. A liquid level not lower than that indicated by line 370, which is just above the tops of the main portions of anodes 308, nor higher than level 372 near the top of the cell is maintained in each cell unit. This permits circulation of electrolyte over the upper edges of the main portions of the anodes, below anodes 308 and cathode screens 332, and around the extremities of cathode screens 332. Chlorine which is generated is moved from outlet 340 in the anode chamber. Sodium hydroxide is formed at the cathode, and a solution containing 9 to 11.5 percent sodium hydroxide, some unreacted sodium chloride and traces of sodium chlorate is removed through liquid outlet 344 in the lower portion of side wall 304 in communication with the cathode chamber. Hydrogen, which is liberated at the cathode, is removed through outlet 336 communicating with the upper portion of the cathode chamber.

Electricity flows through each cell unit from cathode 302 and conductor bolt 360 of the previous adjacent unit cell to conductive cover 306, anodes 308, thence through the electrolyte to cathode screens 332 and cathode walls 322, 323, 324. From wall portion 324 current flows through conductor bolts 360 to cover 306 of the next adjacent cell and so on through the entire cell series. The anode current density is preferably maintained at about 66 to 70 amperes per square foot, but may be much higher, up to about 95 or 100 amperes per square foot of graphite surface. The voltage drop across each cell unit is about 3.1 to 4 volts.

Several embodiments of the present invention have been shown by way of illustration. Various modifications may be made without departing from the scope of the present invention. Various features shown in different embodiments of the invention may be combined in manners not specifically illustrated. Thus, for example, any cover shown herein may be used in either chlorine or sodium chlorate cells according to the present invention. The scope of this invention shall be limited only by the scope of the appended claims.

I claim:

1. An electrolytic cell series comprising a plurality of adjoining cell units each having a bottom and side walls, a series of longitudinally spaced cathode structures, each having an end section extending transversely of the cell, said end sections forming end walls of said cell units, spaced cathode fingers extending from one side of said end section in a direction longitudinally of the cell and a non-conductive surface on the opposite side of said end section, said fingers terminating short of the end section of the next adjacent cathode, electrically conductive members for each cell unit electrically isolated from the cathode of said unit, anodes connected to said members and extending into the spaces between the cathode fingers, and means for electrically connecting each member to the end section of the next adjacent cell unit.

2. An electrolytic cell series comprising a plurality of cell units each having a base and side walls, a series of longitudinally spaced cathode structures each having an end section extending transversely of the cell, said end sections forming end walls of said cell units, spaced cathode fingers extending from one side of said end section in a direction longitudinally of the cell and a non-conductive surface on the opposite side of said end section, said fingers terminating short of the end section of the next adjacent cathode, diaphragm means surrounding said cathode fingers and dividing each cell unit into anode and cathode compartments, electrically conductive covers for each cell unit electrically isolated from the cathode of said unit, anodes depending from the cover into the spaces between the cathode fingers, and means for electrically connecting each cover to the end section of the next adjacent cell unit.

3. An electrolytic cell series comprising a plurality of cell units each having a base and side walls, a series of longitudinally spaced cathode structures each having an end section extending transversely of the cell, said end sections forming end walls of said cell units, spaced cathode fingers extending from one side of said end section in a direction longitudinally of the cell and a non-conductive surface on the opposite side of said end section, said fingers terminating short of the end section of the next adjacent cathode, diaphragm means surrounding said cathode fingers and dividing each cell unit into anode and cathode compartments, covers for each cell unit electrically isolated from the cathode of said unit, a plurality of grooves in said cover, anodes depending from the cover into the spaces between the cathode fingers, said anodes having top portions received in the grooves, and means for electrically connecting the cover to the end section of the next adjacent cell unit.

4. An electrolytic cell series comprising a plurality of adjoining cell units each having a base and side walls, a series of longitudinally spaced cathode structures each having an end section extending transversely of the cell, said end sections forming end walls of said cell units, spaced cathode fingers extending from one side of said end section in a direction longitudinally of the cell and a non-conductive surface on the opposite side of said end sections, said fingers terminating short of the end section of the next adjacent cathode, diaphragm means surrounding said cathode fingers and dividing each cell unit into anode and cathode compartments, covers for each cell unit electrically isolated from the cathode of said unit, anodes depending from the cover into the spaces between the cathode fingers, said anodes being secured to the cover by supporting rods, and means for electrically connecting the cover to the end section of the next adjacent cell unit.

5. An electrolytic cell series comprising a plurality of cell units each having a bottom and side walls, a series of longitudinally spaced cathode structures each having an end section extending transversely of the cell, said end section forming end walls of said cell units, spaced hollow cathode fingers extending from one side of said end section in a direction longitudinally of the cell and a non-conductive surface on the opposite side of said end section, said fingers terminating short of the end section of the next adjacent cathode, covers for each cell unit electrically isolated from the cathode of said unit, anodes depending from the cover into the spaces between the cathode fingers, the space between said anodes and the adjacent cathode fingers being unobstructed, and means for electrically connecting the cover to the end section of the next adjacent cell unit.

6. An electrolytic cell series comprising a plurality of cell units each having a bottom and side walls, a series of longitudinally spaced cathode structures each having an end section extending transversely of the cell, said end sections forming end walls of said cell units, spaced hollow cathode fingers extending from one side end section in a direction longitudinally of the cell and a non-conductive surface on the opposite side of said end section, said fingers terminating short of the end section of the next adjacent cathode, means for passing cooling water through the interiors of said cathode fingers, covers for each cell unit electrically isolated from the cathode of said unit, anodes depending from the cover into the spaces between the cathode fingers, and means for electrically connecting the cover to the end section of the next adjacent cell unit.

7. An electrolytic cell series comprising a plurality of cell units each having a bottom and side walls, a series of longitudinally spaced cathode structures each having an end section extending transversely of the cell, said end sections forming end walls of said cell units, spaced hollow cathode fingers extending from one side of said end section in a direction longitudinally of the cell and a non-conductive surface on the opposite side of said end section, said fingers terminating short of the end section of the next adjacent cathode, covers for each cell unit electrically isolated from the cathode of said unit, anodes depending from each cover into the spaces between the cathode fingers, said anodes being supported by rods secured thereto and to the cover, and means for electrically connecting each cover to the end section of the next adjacent cell unit.

8. An electrolytic cell system which comprises: a series of cell bottoms disposed in end to end relation, a series of longitudinally spaced cathode assemblages which comprise an end section on the cell bottom and extend laterally across the cell forming end walls of cell units, spaced cathode elements extending horizontally from one side of each of said end sections and terminating short of the next adjacent end section, and a nonconductive layer on the opposite side of said end sections; side walls engaging said end sections and bottom, thus enclosing said cell units, each of said cathode assemblages being out of electrical contact with the next adjacent cathode assemblage, and a plurality of anode assemblages comprising roof sections covering said cell units, each of said anode assemblages being in electrical contact with one of said cathode end sections but out of electrical contact with the next adjacent end section and anodes depending from said roof sections into the spaces between said cathode elements.

9. An electrolytic cell series comprising a plurality of adjoining cell units each having a bottom and side walls, a series of longitudinally spaced cathode structures, each having an end section extending transversely of the cell, said end sections forming end walls of said cell units, spaced cathode fingers extending from one side of said end section in a direction longitudinally of the cell and a non-conductive surface on the opposite side of said end section, said fingers terminating short of the end section of the next adjacent cathode, an electrically conductive cover plate for each cell unit electrically isolated from the cathode of said unit and having anodes depending therefrom and embedded therein in electrical contact, at least a portion of said embedded section having a longitudinal taper of about 1.5 degrees, said anodes extending from the cover plate into the spaces between the cathode fingers, and means for electrically connecting each cover to the end section of the next adjacent cell unit.

10. An electrolytic cell series comprising a plurality of adjoining cell units each having a bottom and side walls, a series of longitudinally spaced cathode structures, each having an end section extending transversely of the cell, said end sections forming end walls of said cell units, spaced cathode fingers extending from one side of said end section in a direction longitudinally of the cell and a non-conductive surface on the opposite side of said end section, said fingers terminating short of the end section of the next adjacent cathode, an electrically conductive cover plate for each cell unit electrically isolated from the cathode of said unit and having anodes depending therefrom and extending into the spaces between the cathode fingers, said anodes being in tapered electrical contact on said plate and embedded therein in a mating contact, the taper of said contact being about 1.5 degrees, and means for electrically connecting each cover to the end section of the next adjacent unit.

11. An electrolytic cell series comprising a plurality of adjoining cell units each having a bottom and side walls, a series of longitudinally-spaced, hollow cathode structures, each having an end section extending transversely of the cell, said end sections forming end walls of said cell units, spaced cathode fingers extending from one side of said end section in a direction longitudinally of the cell and a non-conductive surface on the opposite side of said end section, said fingers terminating short of the opposite end section, an electrically conductive cover plate for each cell unit electrically isolated from the cathode of said unit and having anodes depending therefrom and embedded therein in electrical contact, at least a portion of said embedded section having a longitudinal taper of about 1.5 degrees, said anodes extending from the cover plate into spaces between the cathode fingers, and means for electrically connecting each cover to the end section of the next cell unit.

12. An electrolytic cell series comprising a plurality of adjoining cell units each having a bottom and side walls, a series of longitudinally spaced cathode structures each having an end section extending transversely of the cell, said end sections forming end walls of said cell units, spaced cathode fingers extending from one end side of said section in a direction longitudinally of the cell and a non-conductive surface on the opposite side of said end section, said fingers terminating short of the end section of the next adjacent cathode, diaphragm means surrounding said cathode fingers and dividing each cell unit into anode and cathode compartments, an electrically conductive cover plate for each cell unit electrically isolated from the cathode of said unit and having anodes depending therefrom and extending into the spaces between the cathode fingers, said anodes being in tapered electrical contact on said plate and embedded therein in a mating contact, the taper of said contact being about 1.5 degrees, and means for electrically connecting each cover to the end section of the next unit.

References Cited in the file of this patent

UNITED STATES PATENTS

| | | |
|---|---|---|
| 896,749 | Nistle et al. | Aug. 25, 1908 |
| 1,206,965 | Whitehead | Dec. 5, 1916 |
| 1,296,046 | Charbonneaux | Mar. 4, 1919 |
| 2,330,404 | Burns et al. | Sept. 28, 1943 |
| 2,443,112 | Morin | June 8, 1948 |
| 2,515,614 | Schumacher | July 18, 1950 |
| 2,562,150 | Osborne | July 24, 1951 |
| 2,617,762 | Basilewsky | Nov. 11, 1952 |

UNITED STATES PATENT OFFICE
CERTIFICATE OF CORRECTION

Patent No. 2,920,028

January 5, 1960

Sydney Forbes

It is hereby certified that error appears in the printed specification of the above numbered patent requiring correction and that the said Letters Patent should read as corrected below.

Column 2, line 47, for "or base" read -- of base --; column 7, line 66, for "hte" read -- the --; column 11, line 51, for "section" read -- sections --; column 13, line 26, and column 14, line 1, for "one end side of said section" read -- one side of said end section --.

Signed and sealed this 1st day of November 1960.

(SEAL)
Attest:

KARL H. AXLINE
Attesting Officer

ROBERT C. WATSON
Commissioner of Patents